United States Patent
Bothello et al.

(10) Patent No.: US 11,716,407 B2
(45) Date of Patent: *Aug. 1, 2023

(54) SELF-SERVICE OPERATION FOR BARE-METAL SERVERS

(71) Applicant: Walmart Apollo, LLC, Bentonville, AR (US)

(72) Inventors: Gerald Bothello, Foster City, CA (US); Surajit Roy, Gilroy, CA (US); Shriniwas Phalke, Mountain House, CA (US); Sumeet Singh, Fremont, CA (US); Biswal Kumar, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/379,891

(22) Filed: Jul. 19, 2021

(65) Prior Publication Data

US 2021/0355241 A1 Nov. 18, 2021

Related U.S. Application Data

(63) Continuation of application No. 16/260,986, filed on Jan. 29, 2019, now Pat. No. 11,095,749.

(51) Int. Cl.
| | |
|---|---|
| G06F 11/07 | (2006.01) |
| H04L 67/60 | (2022.01) |
| C08B 5/14 | (2006.01) |
| D01F 2/28 | (2006.01) |
| H04L 67/01 | (2022.01) |
| H04L 41/5074 | (2022.01) |

(52) U.S. Cl.
CPC ............ *H04L 67/60* (2022.05); *C08B 5/14* (2013.01); *D01F 2/28* (2013.01); *G06F 11/0709* (2013.01); *H04L 67/01* (2022.05); *H04L 41/5074* (2013.01)

(58) Field of Classification Search
CPC ............ G06F 11/0709; G06F 11/0793; G06F 11/3006; G06F 11/3051; G06F 11/0748; H04L 41/5074
See application file for complete search history.

(56) References Cited

U.S. PATENT DOCUMENTS

| | | | |
|---|---|---|---|
| 2007/0300228 A1 | 12/2007 | White, III et al. | |
| 2009/0150714 A1* | 6/2009 | Gasperson | G06F 11/2294 714/E11.159 |
| 2011/0137697 A1 | 6/2011 | Yedatore et al. | |
| 2012/0303739 A1 | 11/2012 | Ferris | |
| 2014/0068343 A1* | 3/2014 | Nakajima | G06F 11/0793 714/39 |

(Continued)

*Primary Examiner* — Yolanda L Wilson
(74) *Attorney, Agent, or Firm* — Morgan, Lewis & Bockius LLP; Manita Rawat

(57) ABSTRACT

A system and method of automated downtime scheduling and control is disclosed. A failure of at least one component of at least one bare-metal server associated with a client is detected and a first notification is transmitted to a client system associated with the client. The notification includes a request to schedule downtime. A response including a selected downtime is received from the client system and the at least one bare-metal server is transitioned to an offline state at the selected downtime. A ticket is generated in a ticketing system for repair of the bare-metal server. The ticket identifies the at least one component.

17 Claims, 4 Drawing Sheets

(56) References Cited

U.S. PATENT DOCUMENTS

| | | | |
|---|---|---|---|
| 2014/0075008 A1* | 3/2014 | Douglas | G06F 11/0709 |
| | | | 709/224 |
| 2015/0311952 A1 | 10/2015 | Varma et al. | |
| 2016/0132372 A1* | 5/2016 | Anderson | G06N 5/02 |
| | | | 714/15 |
| 2017/0024271 A1* | 1/2017 | Teli | G06Q 10/20 |
| 2017/0180421 A1 | 6/2017 | Shieh et al. | |
| 2017/0272311 A1 | 9/2017 | Kerpez et al. | |
| 2017/0344354 A1 | 11/2017 | Schiefelbein | |
| 2018/0136960 A1 | 5/2018 | Zhang et al. | |
| 2018/0189130 A1* | 7/2018 | Mowry | G06F 11/0784 |
| 2018/0203752 A1* | 7/2018 | Howie | G06F 11/3452 |
| 2019/0149399 A1* | 5/2019 | Reed | H04L 41/0895 |
| | | | 709/223 |

\* cited by examiner

SELF-SERVICE OPERATION FOR BARE-METAL SERVERS

CROSS-REFERENCE TO RELATED APPLICATIONS

This application is a continuation of U.S. patent application Ser. No. 16/260,986 filed Jan. 29, 2019, which are incorporated herein by reference in their entireties for all purposes.

TECHNICAL FIELD

This application is directed to monitoring of a server and, more specifically, is directed to maintenance cycles for bare-metal servers.

BACKGROUND

Bare-metal servers are single-tenant physical servers including hardware, such as processors, hard drives, etc., that are physically separated from hardware leased and/or controlled by other tenants. Bare-metal servers provide machine-level control to server tenants such that the tenants can identify the exact hardware at a component level that is performing operations. Bare-metal servers are alternatives to virtual servers in which multiple servers for multiple tenants share hardware.

Because bare-metal servers are physical servers with dedicated hardware, failure of any element of the server requires the bare-metal server to be taken offline. Schedule replacement of failed server parts, such as failed hard drives, requires coordination between multiple entities or individuals, including the server tenant, server owner, server operator, and hardware vendor. Scheduling and managing downtime of bare-metal servers is a time intensive and resource intensive task.

SUMMARY

In various embodiments, a system including a computing device is disclosed. The computing device is configured to detect a failure of at least one component of at least one bare-metal server associated with a client and transmit a first notification to a client system associated with the client, wherein the notification includes a request to schedule downtime. The computing device is further configured to receive a response from the client system. The response includes a selected downtime. The computing device is further configured to transition the at least one bare-metal server to an offline state at the selected downtime and generate a ticket in a ticketing system for repair of the bare-metal server, wherein the ticket identifies the at least one component.

In various embodiments, a non-transitory computer readable medium is disclosed. The non-transitory computer readable medium can have instructions stored thereon that, when executed by a processor, cause a device to perform operations that include detecting a failure of at least one component of at least one bare-metal server associated with a client and transmitting a first notification to a client system associated with the client, wherein the notification includes a request to schedule downtime. The operations can further include receiving a response from the client system. The response includes a selected downtime. The operations can further include transitioning the at least one bare-metal server to an offline state at the selected downtime and generating a ticket in a ticketing system for repair of the bare-metal server, wherein the ticket identifies the at least one component.

In various embodiments, a method for scheduling and controlling downtime of a bare-metal server is disclosed. The method can include detecting a failure of at least one component of at least one bare-metal server associated with a client and transmitting a first notification to a client system associated with the client, wherein the notification includes a request to schedule downtime. The method can further include receiving a response from the client system. The response includes a selected downtime. The method can further include transitioning the at least one bare-metal server to an offline state at the selected downtime and generating a ticket in a ticketing system for repair of the bare-metal server, wherein the ticket identifies the at least one component.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
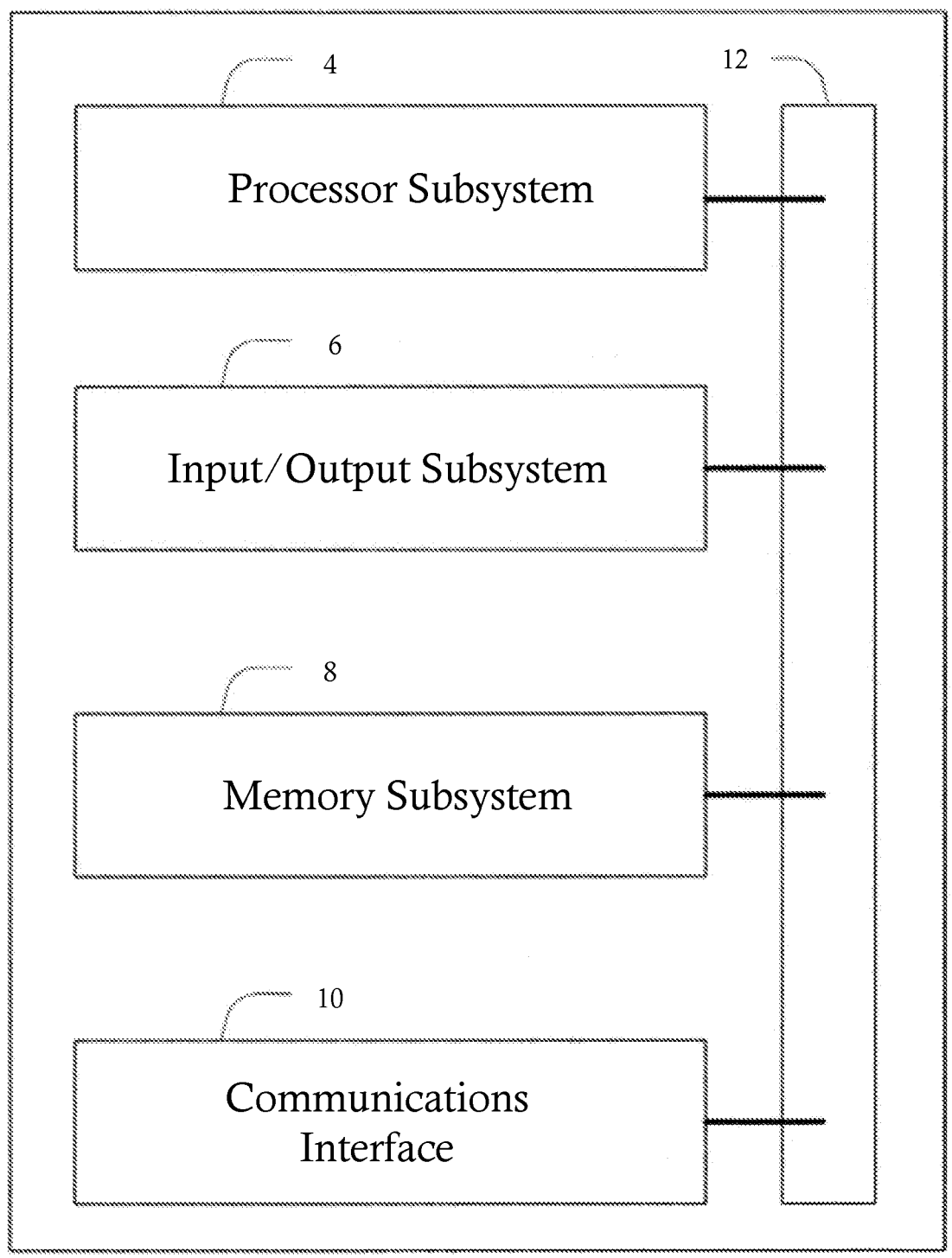
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship. In the claims, means-plus-function clauses, if used, are intended to cover structures described, suggested, or rendered obvious by the written description or drawings for performing the recited function, including not only structure equivalents but also equivalent structures.

In various embodiments, a system and method for scheduling and controlling downtime of a bare-metal server is disclosed. One or more bare-metal servers are monitored by a monitoring process. Each bare-metal server includes a plurality of hardware components. When failure of one or more hardware components is detected, an automated control process generates a notification that is provided to a client system and requests the client system to schedule downtime of the bare-metal server. After receiving a response from the client system, the automated control process transitions the bare-metal server offline at the selected time and generates a repair ticket for correcting the one or more hardware failures detected. At a later time, the automated control process receives a notification that the bare-metal server has been repaired. The automated control process generates a notification to the client system to schedule uptime of the bare-metal server. After receiving a response from the client system, the automated control process transitions the bare-metal server online at the selected time and starts one or more processes on the bare-metal server.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (110) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n/ac, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
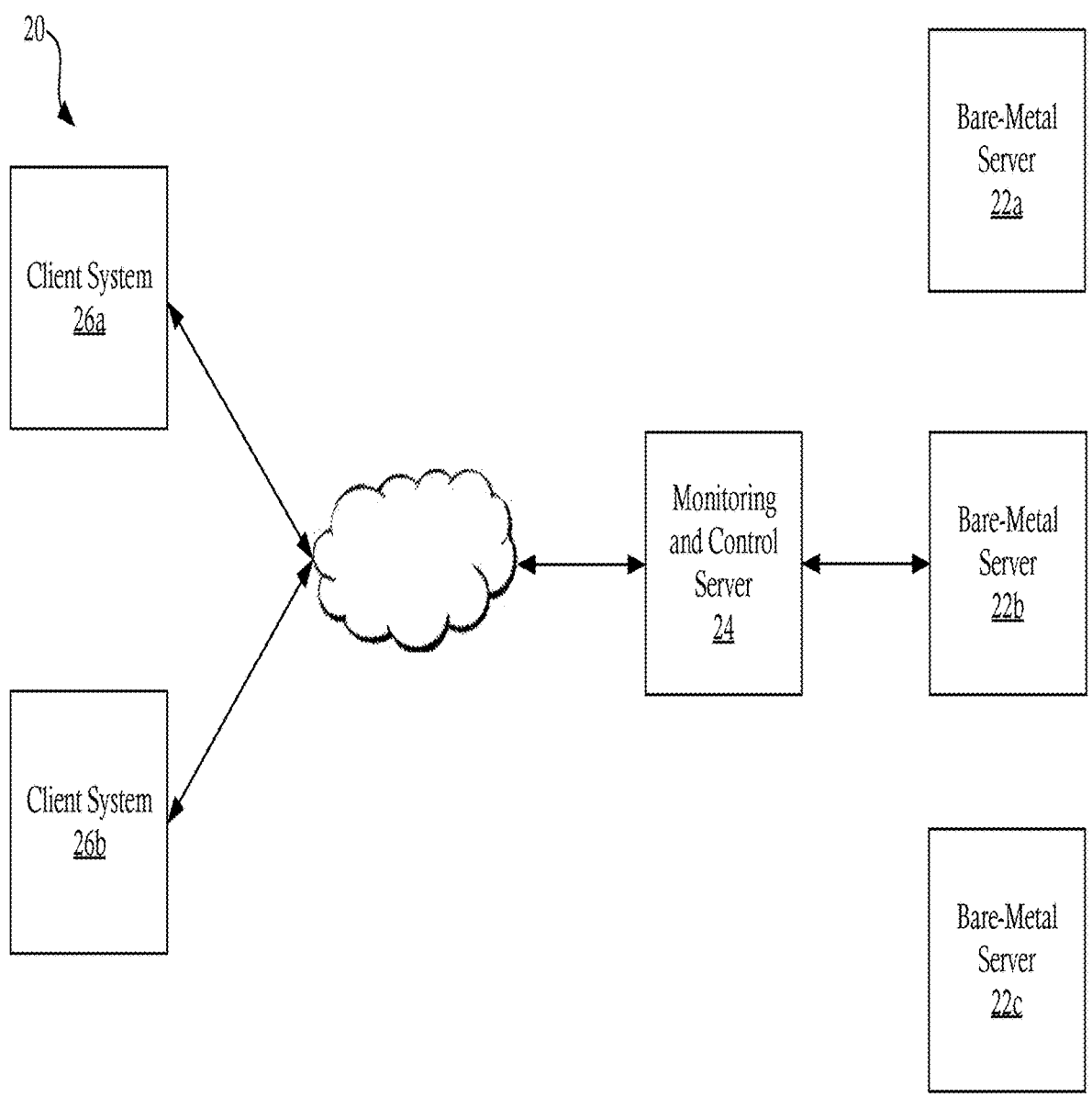
FIG. 2 illustrates a network configured to provide automated scheduling and control of downtime for one or more bare-metal servers, in accordance with some embodiments.

FIG. 2 illustrates a network 20 configured to provide automated scheduling and control of downtime for bare-metal servers 22a-22c, in accordance with some embodiments. The network 20 includes a plurality of bare-metal servers 22a-22c, each configured to provide one or more network applications for a tenant. Each of the bare-metal servers 22a-22c are in signal communication with at least one monitoring and control server 24. The monitoring and control server 24 is configured to perform and/or receive the results of one or more scans of each of the bare-metal servers 22a-22c, such as, for example, hardware scans, software scans, etc.

In some embodiments, one or more client systems 26a-26b are in signal communication with the monitoring and control server 24. The monitoring and control server 24 is configured to transmit and/or receive commands to and/or from the one or more client systems 26a-26b and/or the bare-metal servers 22a-22c. For example, as discussed in greater detail below, the monitoring and control server 24 may be configured to monitor and control a process flow for scheduling downtime of a bare-metal server 22a-22c. In some embodiments, the monitoring and control server 24 is configured to implement an automated control process for controlling operation of the bare-metal servers 22a-22c based on input from the bare-metal servers 22a-22c, the monitoring and control server 24, and/or the client system 26a-26b.

Each of the systems 22a-26b can include a system 2 as described above with respect to FIG. 1, and similar description is not repeated herein. Although the systems 22-26b are each illustrated as independent systems, it will be appreciated that each of the systems 22-26b may be combined, separated, and/or integrated into one or more additional systems. For example, in some embodiments, the user systems 28a, 28b may be implemented by a shared server or client system.

Figure 3:
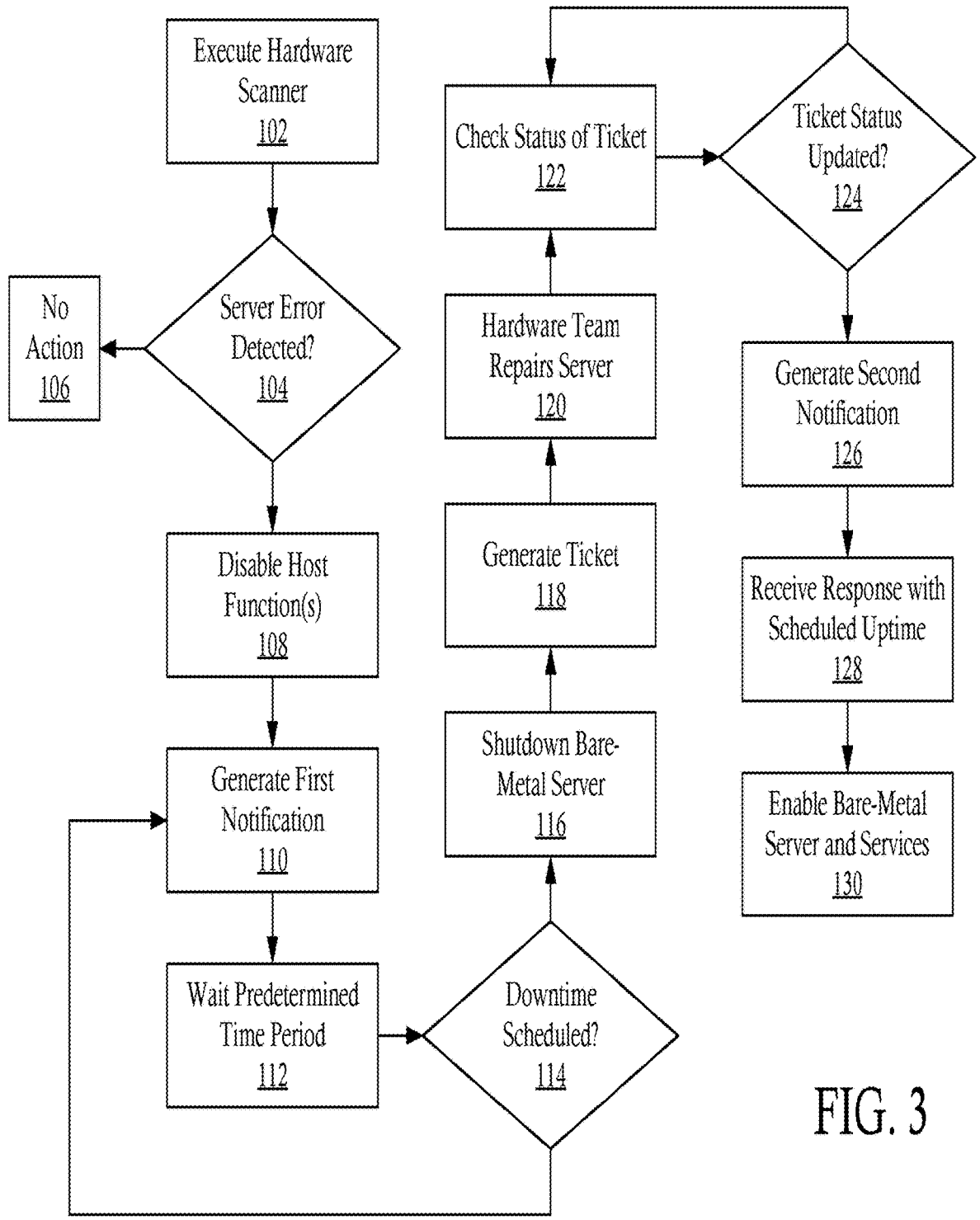
FIG. 3 illustrates a process flow for scheduling and controlling downtime of a bare-metal server, in accordance with some embodiments.
Figure 4:
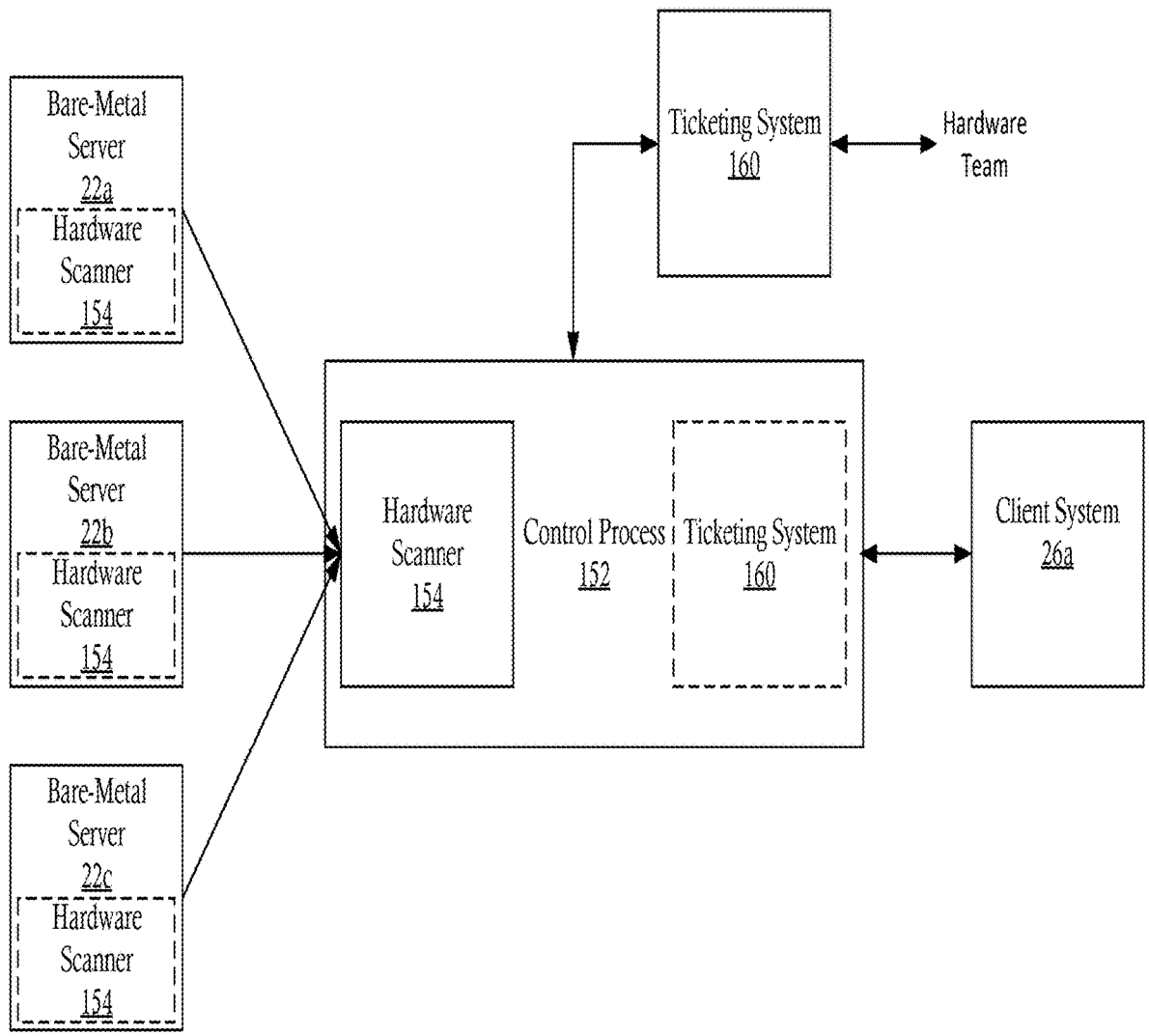
FIG. 4 illustrates various system components during execution of the process flow illustrated in FIG. 3, in accordance with some embodiments.

FIG. 3 illustrates a process flow 100 for scheduling and controlling downtime of a bare-metal server, in accordance with some embodiments. FIG. 4 illustrates various system elements of a system 150 during execution of the process flow 100 illustrated in FIG. 3, in accordance with some embodiments. In some embodiments, the system 150 includes an automated control process 152 configured to implement and execute the process flow 100. The automated control process 152 may be implemented by any suitable system, such as, for example, the monitoring and control system 24 illustrated in FIG. 2. At step 102, a hardware scanner 154 is implemented to determine the status of each hardware component (or a subset of hardware components) of each bare-metal server 22a-22c (or subset of bare-metal servers 22a-22c). A hardware scanner 154 may be implemented by each bare-metal server 22a-22c and/or may be implemented by the automated control process 152. The hardware scanner 154 is configured to identify hardware elements, such as disk drives, solid state drives, processors, memory, and/or any other component, that are operating incorrectly and/or not operating.

At step 104, the automated control process 152 performs a check to determine if each bare-metal server 22a-22c is operating correctly. If no errors are detected, the process 100 proceeds to step 106 and no actions are taken. If an error is detected in a bare-metal server 22a, the automated control process 152 generates a command to transition the bare-metal server 22a to a reduced operation, or disabled, state at step 108. In the reduced operation state, one or more functions of the bare-metal server 22a are restricted and/or disabled. For example, in some embodiments, a bare-metal server 22a in a reduced operation state is prohibited from generating new instances of applications, performing restarts, updating, and/or performing other functions. In some instances, a critical component, such as a processor, may fail and the bare-metal server 22a may be offline as a result of the failure. If the bare-metal server 22a is offline, the process flow 100 proceeds directly to step 118 (as the server 22a is offline and cannot be placed in a reduced operation state and downtime does not need to be scheduled).

At step 110, the automated control process 152 generates a first notification and/or control message that is provided to a client system 26a associated with the reduced/offline bare-metal server 22a. For example, in some embodiments, the client system 26a is owned and/or operated by the same entity that rents and/or controls the bare-metal server 22a. The first notification may be provided using any suitable messaging platform, such as, for example, e-mail, direct messaging, push messaging, pop-up notifications, and/or any other suitable messaging platform. The first notification may include information regarding the type of hardware failure detected by the hardware scanner, the types of operations that are restricted or prohibited in the server (e.g., the consequences of operating in a reduced operational state), instructions for scheduling downtime for repairing the bare-metal server 22a, and/or other information generated by the automated control process 152.

In some embodiments, the first notification includes a request to schedule downtime for the bare-metal server 22a. The request is configured to solicit a time and date when the bare-metal server 22a can be taken offline to repair/replace the detected faulty hardware. The downtime may be provided by a client via the client system 26a, via an automated process implemented by the client system 26a, etc. The downtime can indicate an initial time after which the bare-metal server 22a can be taken offline, a bounded time window during which the bare-metal server 22a can be offline, and/or any other suitable time period or window.

At step 112, the automated control process 152 waits a predetermined time period for a response from the client system 26a associated with the bare-metal server 22a. The predetermined time period may be any suitable time period, such as, for example, minutes, hours, days, etc. In some embodiments, the predetermined time period corresponds to one or more other actions taken by the automated control process 152. For example, in some embodiments, the automated control process 152 may initiate a hardware scan process 154 each day at a preset time (e.g., 12 AM). The predetermined time period may extend from generation of the notification at step 110 to the next hardware scan performed by the hardware scan element 154. After the predetermined time period, the process flow 100 proceeds to step 114.

At step 114, the automated control process 152 determines whether the client system 26a has responded with a downtime window suitable for repair of the bare-metal server 22a. If a response has been received, i.e., the downtime has been scheduled, the process flow 100 proceeds to step 116. If downtime has not been schedule and/or the schedule downtime is not appropriate, the process flow 100 returns to step 110 and generates a new notification.

At step 116, the automated control process 152 transitions the bare-metal server 22a offline at the scheduled time, i.e., the scheduled downtime. For example, in some embodiments, the automated control process 152 generates and transmits a shutdown command to the bare-metal server 22a. In other embodiments, the automated control process 152 may control power and/or other services to force the bare-metal server 22a to transition to an offline state. The bare-metal server 22a is taken offline and the automated control process 152 generates 118 a ticket within a ticketing system 160 for repair of the bare-metal server 22a. The ticket may include any suitable information, such as, for example, the results of the hardware scan performed at step 102, the downtime window received at step 114, and/or any other suitable information. The ticket can be generated within any suitable ticketing system 160, such as, for example, Jira, VersionOne, PivotalTracker, etc. The ticketing system 160 may be implemented by the automated control process 152 (as shown), implemented on a shared system with the automated control process 152, and/or implemented on a separate system.

At step 120, the hardware of the bare-metal server 22a is repaired or replaced and the status of the ticket is updated. In some embodiments, the ticket generated at step 118 is provided to a hardware team system that schedules and directs a hardware team or vendor to perform the repair and/or replacement necessary to fix the bare-metal server 22a. At step 122, the automated control process 152 checks the status of the generated ticket and determines 124 if the hardware repair/replacement has been completed. For example, in some embodiments, a ticket may be marked as "done" or "ready to review" when the hardware of the bare-metal server 22a has been repaired/replaced. If the hardware repair/replacement has not been performed, the process flow 100 returns to step 122 and, after a predetermined time period, performs subsequent checks to determine if the hardware has been repaired. If the ticket has been updated to indicate the bare-metal server 22a has been repaired, the process flow 100 proceeds to step 126.

At step 126, the automated control process 150 generates and transmits a second notification to the client system 26a associated with the bare-metal server 22a. The second notification may be provided using any suitable messaging platform, such as, for example, e-mail, direct messaging, push messaging, pop-up notifications, and/or any other suitable messaging platform. The messaging platform may be the same as the messaging platform used to generate the first notification and/or a different messaging platform. The second notification may include information regarding the repair of the bare-metal server 22a, instructions for scheduling uptime for the bare-metal server 22a, and/or other information generated by the automated control process 152.

In some embodiments, the notification message includes a request to schedule uptime for the bare-metal server 22a. The request to schedule uptime is configured to solicit a time and date when the bare-metal server 22a should be brought online. The uptime may be provided by a client via the client system 26a, via an automated process implemented by the client system 26a, etc. At step 128, the automated control process 152 receives a response from the client system 26a including a scheduled uptime and, at step 130, the automated control process 152 enables the bare-metal server 22a. In some embodiments, the automated control process 152 may generate a command for the bare-metal server 22a to transition the bare-metal server 22a from an off-state to an on-state. In other embodiments, the bare-metal server 22a may be in an on-state after being repaired. The automated control process 152 enables a host on the bare-metal server 22a, starts one or more services (such as a virtual machine), and generates a notification for the client system 26a that the bare-metal server 22a is online.

Although the subject matter has been described in terms of exemplary embodiments, it is not limited thereto. Rather, the appended claims should be construed broadly, to include other variants and embodiments, which may be made by those skilled in the art.

What is claimed is:

1. A system comprising a non-transitory memory having instructions stored thereon, and a processor configured to read the instructions to: detect a failure of at least one component of at least one bare-metal server associated with a client; transmit a first notification to a client system associated with the client, wherein the notification includes a request configured to solicit a scheduled downtime that includes a time and date when the at least one bare-metal server can be taken offline; receive a response from the client system, the response including the scheduled downtime; transition the at least one bare-metal server to an offline state at the scheduled downtime; generate a ticket in a ticketing system for repair of the bare-metal server, wherein the ticket identifies the at least one component; generate a second notification to the client system, wherein the second notification includes a request configured to solicit a scheduled uptime, wherein the scheduled uptime includes a time and date when the at least one bare-metal server can be brought online; receive a second response from the client system, the second response including the scheduled uptime; and transition the at least one bare-metal server from the offline state to an online state at the scheduled uptime.

2. The system of claim 1, wherein the processor is configured to transition the at least one bare-metal server to a reduced operation state before transitioning the at least one bare-metal server to the offline state.

3. The system of claim 2, wherein the at least one bare-metal server is prohibited from generating new instances of applications, performing restarts, and updating when in the reduced operation state.

4. The system of claim 2, wherein the first notification includes information regarding the types of operations that are restricted in the at least one bare-metal server when the at least one bare-metal server is operating in the reduced operation state.

5. The system of claim 1, wherein the request configured to solicit a scheduled downtime includes an initial time after which the at least one bare-metal server can be taken offline.

6. The system of claim 1, wherein the request configured to solicit a scheduled downtime includes a bounded time window during which the at least one bare-metal server can be taken offline.

7. A method comprising: detecting a failure of at least one component of at least one bare-metal server associated with a client; transmitting a first notification to a client system associated with the client, wherein the notification includes a request configured to solicit a time and date when the bare-metal server can be taken offline; receiving a response from the client system, the response including a selected downtime; transitioning the at least one bare-metal server to an offline state at the selected downtime; generating a ticket in a ticketing system for repair of the bare-metal server, wherein the ticket identifies the at least one component, generating a second notification to the client system, wherein the second notification includes a request configured to solicit a scheduled uptime, wherein the scheduled uptime includes a time and date when the at least one bare-metal server can be brought online; receiving a second response from the client system, the second response including the scheduled uptime; and transitioning the at least one bare-metal server from the offline state to an online state at the scheduled uptime.

8. The method of claim 7, comprising transitioning the at least one bare-metal server to a reduced operation state before transitioning the at least one bare-metal server to the offline state.

9. The method of claim 8, wherein the at least one bare-metal server is prohibited from generating new instances of applications, performing restarts, and updating when in the reduced operation state.

10. The method of claim 8, wherein the first notification includes information regarding the types of operations that are restricted in the at least one bare-metal server when the at least one bare-metal server is operating in the reduced operation state.

11. The method of claim 7, wherein the request configured to solicit a scheduled downtime includes an initial time after which the at least one bare-metal server can be taken offline.

12. The method of claim 7, wherein the request configured to solicit a scheduled downtime includes a bounded time window during which the at least one bare-metal server can be taken offline.

13. A non-transitory computer readable medium having instructions stored thereon, the instructions, when executed by a processor, cause the processor to perform operations comprising: detecting a failure of at least one component of at least one bare-metal server associated with a client; transmitting a first notification to a client system associated with the client, wherein the notification includes a request configured to solicit a time and date when the bare-metal server can be taken offline; receiving a response from the client system, the response including a selected downtime; transitioning the at least one bare-metal server to an offline state at the selected downtime; generating a ticket in a ticketing system for repair of the bare-metal server, wherein the ticket identifies the at least one component; generating a second notification to the client system, wherein the second notification includes a request configured to solicit a scheduled uptime, wherein the scheduled uptime includes a time and date when the at least one bare-metal server can be brought online; receiving a second response from the client system, the second response including the scheduled uptime; and transitioning the at least one bare-metal server from the offline state to an online state at the scheduled uptime.

14. The non-transitory computer readable medium of claim 13, wherein the operations further comprise transitioning the at least one bare-metal server to a reduced operation state before transitioning the at least one bare-metal server to the offline state.

15. The non-transitory computer readable medium of claim 14, wherein the at least one bare-metal server is prohibited from generating new instances of applications, performing restarts, and updating when in the reduced operation state.

16. The non-transitory computer readable medium of claim 14, wherein the first notification includes information regarding the types of operations that are restricted in the at least one bare-metal server when the at least one bare-metal server is operating in the reduced operation state.

17. The non-transitory computer readable medium of claim 13, wherein the request configured to solicit a scheduled downtime includes an initial time after which the at least one bare-metal server can be taken offline.

* * * * *